United States Patent [19]
Toman

[11] Patent Number: 5,865,016
[45] Date of Patent: Feb. 2, 1999

[54] RELEASE MECHANISM FOR CUTTING HEAD OF A GANG MOWER

[75] Inventor: Charles R. Toman, Lincoln, Nebr.

[73] Assignee: Ransomes America Corporation, Lincoln, Nebr.

[21] Appl. No.: 797,237

[22] Filed: Feb. 7, 1997

[51] Int. Cl.⁶ .................................................... A01D 75/30
[52] U.S. Cl. ................................ 56/7; 56/249; 56/249.5; 56/289
[58] Field of Search .......................... 56/6, 7, 249, 249.5, 56/289, DIG. 9, 229

[56] References Cited

U.S. PATENT DOCUMENTS

| | | | |
|---|---|---|---|
| 1,401,156 | 12/1921 | Jenkins | 56/7 |
| 1,725,487 | 8/1929 | Steinmetz et al. | 56/7 |
| 1,810,357 | 6/1931 | Lenhart | 56/7 |

(List continued on next page.)

OTHER PUBLICATIONS

Ransomes America Corporation, Turf Care Equipment Manual, portion of section entitled Ransomes Reel (Exhibit 1, 44 pages).
Ransomes America Corporation, Turf Care Equipment Manual, 1994, portion of section entitled Mounted/Trailed (Exhibit 2, 6 pages).
Ferris Industries Advertisement for Hydrowalk 36/48, Jun. 1990 (Exhibit 3, 2 pages).
The Grasshopper Co., Brochure on Model 718/718k, 1988 (Exhibit 4, 2 pages).
Walker Manufacturing Co., Owner's Manual for Model MS36–42 and MC36–54, 1987, pp. 1–43 (Exhibit 5, 48 pages).
Gravely International, Brochure for Pro Series, Sep. 1986, pp. 1–10 (Exhibit 6, 11 pages).
Bunton Company, Brochure on Bunton Mowers, 1986, pp. 1–20 (Exhibit 7, 20 pages).
Ferris Industries, Brochure on Pro Cut Mower (Exhibit 8, 4 pages).
Wheel Horse, Parts and Service Manual for Dixie Chopper 5018 Magnum (Exhibit 9, 3 pages).
Ransomes, Sims & Jeffries Ltd., Ransomes 14 in. Mk. 2 Sprite Electric Operator's Instructions, Pub. No. 19553G (Exhibit 10, 2 pages).
Ransomes, Sims & Jeffries Ltd., Ransomes "Cellec" Mk. 6 Electric Lawn Mower Illustrated Parts List, P.E. A. 565 (Exhibit 11, 6 pages).
Ransomes, Sims & Jeffries Ltd., Ransomes 14 inch (35 cm) Fourteen Electric Mower Illustrated Parts List, Pub. No. 20235G (Reprint) (Exhibit 12, 10 pages).
Ransomes, Sims & Jeffries Ltd., Ransomes 14 inch (35 cm) Fourteen Electric Mower Mark 2 Operator's Instructions, Pub. No. 20411H (Exhibit 13, 8 pages).
Ransomes, Sims & Jeffries Ltd., Ransomes Fourteen Battery Electric Mower Operator's Instructions, Pub. No. 19784H (Reprint) (Exhibit 14, 8 pages).
Ransomes, Sims & Jeffries Ltd., Ransomes 16 in. Mk. 2, Mercury Electric, Pub. No. 18355E (Exhibit 15, 2 pages).
Ransomes, Sims & Jeffries Ltd., Ransomes "Mercury Electric" Mower 16 in. Mark 2 Operator's Instructions and Illustrated List of Parts, CP. A. 599 (Exhibit 16, 20 pages).

(List continued on next page.)

*Primary Examiner*—J. Woodrow Eldred
*Attorney, Agent, or Firm*—Harness, Dickey & Pierce, P.L.C.

[57] ABSTRACT

A latch mechanism which facilities installation and removal of a reel space type cutting head of a gang mower. The latch mechanism includes horizontal slots formed in the vertical plates of a pull frame. The horizontal slots receive bushings attached to the cutting head assembly. When the bushings engage the horizontal slots, locking plates are rotated to engage a horizontal crossrod and fixed in place so that the cutting head is locked in position to the pull frame. The cutting head can similarly be removed from the pull frame by moving the locking plates from a locked to an unlocked position, thereby opening the horizontal slots so that the bushings of the cutting head can be removed.

14 Claims, 6 Drawing Sheets

U.S. PATENT DOCUMENTS

| | | | |
|---|---|---|---|
| 3,090,184 | 5/1963 | Hadek | 56/7 |
| 3,103,090 | 9/1963 | Campbell | 56/6 |
| 3,248,864 | 5/1966 | Barth | 56/26 |
| 3,410,063 | 11/1968 | Speiser | 56/7 |
| 3,429,110 | 2/1969 | Strasel | 56/7 |
| 3,472,005 | 10/1969 | Profenna | 56/7 |
| 3,576,097 | 4/1971 | Speiser | 56/249 |
| 3,589,116 | 6/1971 | Speiser | 56/249 |
| 3,613,337 | 10/1971 | Akgulian et al. | 56/7 |
| 3,668,844 | 6/1972 | Akgulian et al. | 56/7 |
| 3,732,673 | 5/1973 | Winn, Jr. | 56/249 |
| 3,759,019 | 9/1973 | Wells | 56/10.5 |
| 3,832,835 | 9/1974 | Hall et al. | 56/7 |
| 3,854,271 | 12/1974 | Aldred | 56/7 |
| 3,895,481 | 7/1975 | Olney et al. | 56/17.5 |
| 3,910,016 | 10/1975 | Saiia | 56/7 |
| 3,918,239 | 11/1975 | Aldred et al. | 56/7 |
| 3,968,630 | 7/1976 | Mitchell | 56/7 |
| 4,021,996 | 5/1977 | Bartlett et al. | 56/7 |
| 4,161,858 | 7/1979 | Gerrits | 56/7 |
| 4,330,981 | 5/1982 | Hall et al. | 56/7 |
| 4,335,569 | 6/1982 | Keeney et al. | 56/249 |
| 4,370,846 | 2/1983 | Arnold | 56/6 |
| 4,479,346 | 10/1984 | Chandler | 56/250 |
| 4,494,365 | 1/1985 | Lloyd | 56/256 |
| 4,606,178 | 8/1986 | Saiia | 56/249 |
| 4,644,737 | 2/1987 | Arnold | 56/249 |
| 4,653,256 | 3/1987 | Saiia | 56/249 |
| 4,663,920 | 5/1987 | Skovhoj | 56/12.7 |
| 4,663,924 | 5/1987 | Saiia | 56/249 |
| 4,680,922 | 7/1987 | Arnold | 56/7 |
| 4,815,259 | 3/1989 | Scott | 56/6 |
| 4,878,340 | 11/1989 | Roy et al. | 56/249 |
| 4,899,828 | 2/1990 | Harris | 172/21 |
| 4,947,630 | 8/1990 | Rich et al. | 56/249 |
| 5,042,236 | 8/1991 | Lamusga et al. | 56/7 |
| 5,069,022 | 12/1991 | Vandermark | 56/6 |
| 5,197,267 | 3/1993 | Aldred et al. | 56/249 |
| 5,228,277 | 7/1993 | Smith et al. | 56/16.9 |
| 5,265,404 | 11/1993 | Aldred et al. | 56/249.5 |
| 5,297,378 | 3/1994 | Smith | 56/7 |
| 5,343,680 | 9/1994 | Reichen et al. | 56/249 |
| 5,359,839 | 11/1994 | Parsons et al. | 56/130 |
| 5,540,037 | 7/1996 | Lamb et al. | 56/7 |
| 5,553,445 | 9/1996 | Lamb et al. | 56/7 |

OTHER PUBLICATIONS

Ransomes, Sims & Jeffries Ltd., Ransomes Battery "Mercury Electric" Mower 16–in. Mark 3 Operator's Instructions and Illustrated List of Parts, Pub. No. 192654 (Exhibit 17, 16 pages).

Ransomes, Sims & Jeffries Ltd., Ransomes 'Sprite' Mowers List of Parts, Publ. No. 191226 (Exhibit 18, 8 pages).

Ransomes, Sims & Jeffries Ltd., Ransomes 14 inch/18 inch Mk. 8 "Minor Electric", Pub. No. 17736G (Exhibit 19, 2 pages).

Ransomes, Sims & Jeffries Ltd., Ransomes "Minor Electric" Lawn Mower 14–in. and 18–in. Mark 8 Operator's Instructions and Illustrated List of Parts, Pub. No. 17834G (Exhibit 20, 20 pages).

RELEASE MECHANISM FOR CUTTING HEAD OF A GANG MOWER

BACKGROUND OF THE INVENTION

1. Field of the Invention

The present invention relates to riding mowers for use on golf courses and other large grounds, and more particularly relates to riding mowers having a latch mechanism which greatly facilitates attaching and detaching cutting heads from the mower.

2. Discussion

The assignee of the present invention manufacturers and sells riding mowers for turf maintenance. More particularly, the assignee sells both electrically and hydraulically operated mowers for turf maintenance. An example of the all-electric riding greens mower is described in detail in the commonly-assigned patents U.S. Pat. No. 5,406,778, issued Apr. 18, 1995; U.S. Pat. No. 5,540,037, issued Jul. 30, 1996; and U.S. Pat. No. 5,553,445, issued Sep. 10, 1996, the disclosures of which are hereby incorporated by reference.

Whether using an electrically or hydraulically operated mower, turf mowers of the type used on golf courses or other large grounds typically require frequent maintenance. This frequent maintenance periodically necessitates the removal of the cutting heads from the mower to facilitate access to the various parts of the cutting head so that maintenance, repair, and replacement of parts may be more easily performed.

In a typical gang mower, the cutting head attaches to the mower through a pull frame assembly. The pull frame assembly includes a vertically oriented spindle or kingpin inserted into a vertical cylinder attached to the frame of the mower by a lift arm. The spindle is held in place by a linchpin inserted through the spindle on the opposite side of the vertical cylinder to maintain attachment to the vertical cylinder. The pull frame also attaches to the cutting head by bolting to each end of a crossrod which traverses the frame of the cutting head.

In a typical three cutting head mower configuration, two cutting heads are placed in front of the front wheels of the mower, and a third cutting head is placed beneath the operator between the front wheels and the rear wheel of the mower. The center cutting head usually presents the most difficulties of the three cutting heads with respect to removal. The mower frame is relatively close to the ground so that there is insufficient clearance to easily remove the spindle of the pull frame from the vertical cylinder. In such a configuration, the operator must first detach the cutting head from the pull frame by removing shoulder bolts which attach the pull frame to the cutting head via the crossrod.

To unbolt the cutting head, the operator must reach beneath the mower in order to get into a suitable position for removing the shoulder bolts. The operator then removes the shoulder bolts from the cutting head to detach the pull frame from the cutting head. After the shoulder bolts have been removed, the operator then gets onto the mower, starts the engine, raises the lift arm to clear the pull frame from the cutting head, and backs the mower up slightly so that the cutting head can be removed from beneath the mower.

While this operation may seem relatively straightforward, the complexity and compactness of the mower and the attached cutting head significantly complicate this operation. A given cutting head may have several accessories, such as rotary brushes, groomer assemblies, counterweights, front roller scrapers, grooved rollers, and vertical cutters. These accessories may not only impair access to the shoulder bolts, these accessories may completely restrict access to the shoulder bolts without the removal of one or several of these accessories. This increases significantly the operator time required to remove the shoulder bolts so that the cutting head may be removed from the mower. The above difficulties are not easily resolved due to the very limited space available for inserting any additional parts to facilitate installation and removal of the cutting head.

Therefore, it is an object of the present invention to provide a release mechanism to facilitate installation and removal of the cutting head onto and from the mower.

It is a further object of the present invention to provide a release mechanism for facilitating installation and removal of the cutting head onto and from the mower which requires a minimum of space and enables the use of any of a number of various attachments on the cutting head.

It is yet a further object of the present invention to provide a release mechanism for facilitating installation and removal of a cutting head onto and from a mower where the release mechanism is advantageously located between vertical plates of the pull frame and cutting head.

It is yet a further object of the present invention to provide a release mechanism having two operative positions, where one operative position enables installation and removal of the cutting head and the other operative position locks the cutting head onto the pull frame.

SUMMARY OF THE INVENTION

The present invention provides a release mechanism for the reel type cutting heads of a gang mower. A self propelled riding mower includes a vehicle frame supported upon a plurality of ground engaging wheels. The frame supports at least one reel type cutting head which is moveable between a raised, non-operative position and a lowered, operative position in which the cutting head engages the ground. A cutting head support assembly is associated with each cutting head and is attached to the vehicle frame. The cutting head support assembly has a pull frame for attaching the cutting head support assembly to the cutting head. A latch attached to the pull frame fits between the pull frame and the cutting head when the pull frame and cutting head are assembled. The latch facilitates attachment and detachment of the cutting head to the pull frame. Further, a prime mover provides driving torque to at least one of the ground engaging wheels to propel the mower.

In a particularly advantageous feature of the release mechanism, the latch assumes one of two positions during operation. In one position, the latch enables the operator to install and remove the cutting head to the pull frame. In a second position, the latch locks the cutting head to the pull frame. The pull frame has a horizontal slot which receives a bushing attached to the cutting head. The latch includes a locking plate which traps the bushing in the horizontal slot when in the lock position.

These and other advantages and features of the present invention will become readily apparent from the following detailed description, claims and drawings.

DETAILED DESCRIPTION OF THE PREFERRED EMBODIMENTS

The present invention is directed to a release mechanism to facilitate removing the cutting head from a gang mower. For purposes of providing a detailed description of the preferred embodiments of this invention, the invention is described as an electric, triplex greens mower having a frame supported on three wheels, three reel type cutting heads supported from the frame member, an operator station including a seat from which an operator controls the function of the mower, and an on-board battery power source of electrical energy. It should be readily understood that the teachings of the present invention are not limited to the specific type of mower described herein and can be extended to a variety of gang mowers having reel type cutting heads. Such mowers include both electric and hydraulic mowers or combination electro-hydraulic mowers.

Figure 1:
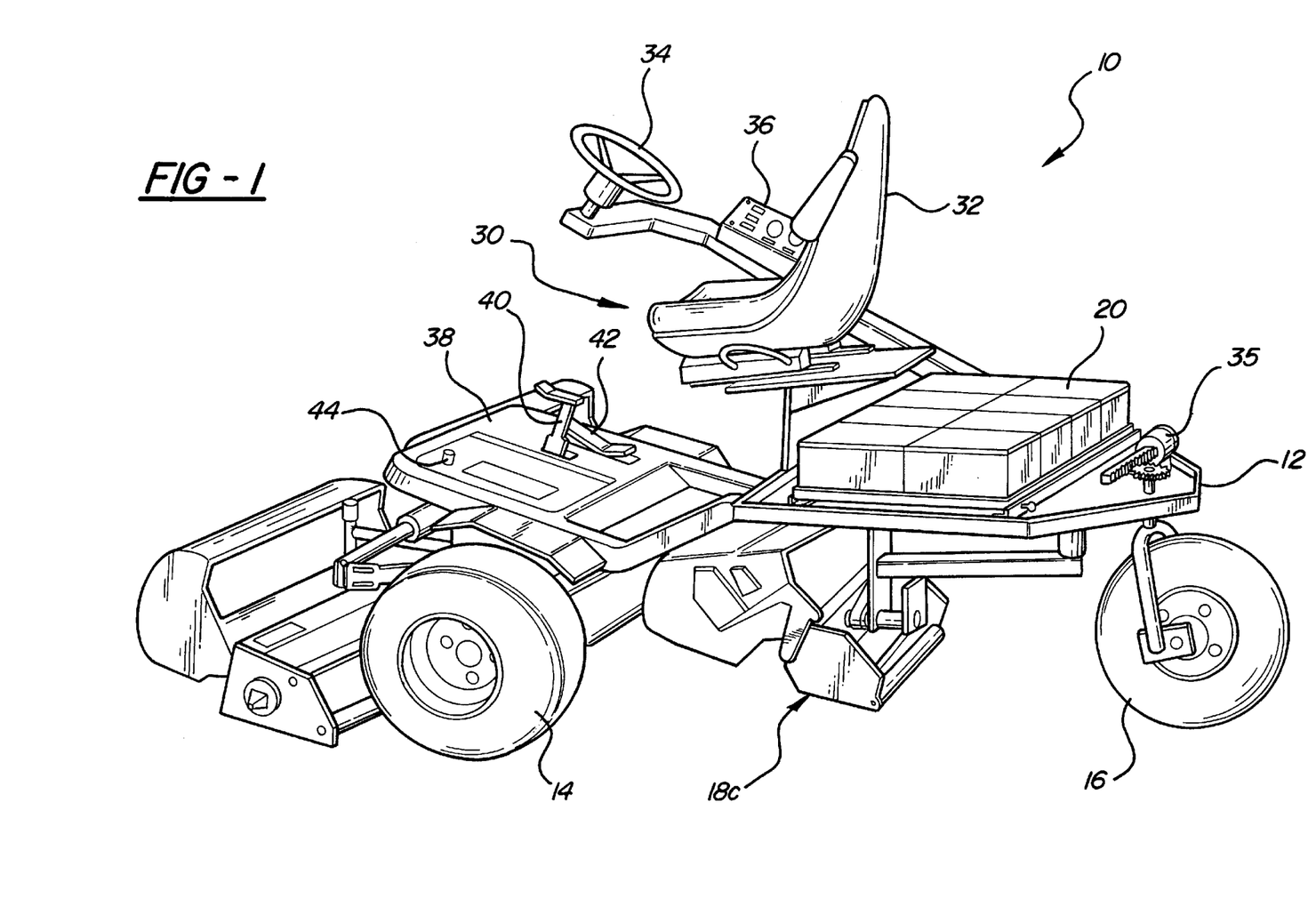
FIG. 1 is a left perspective view of a riding greens mower.
Figure 2:
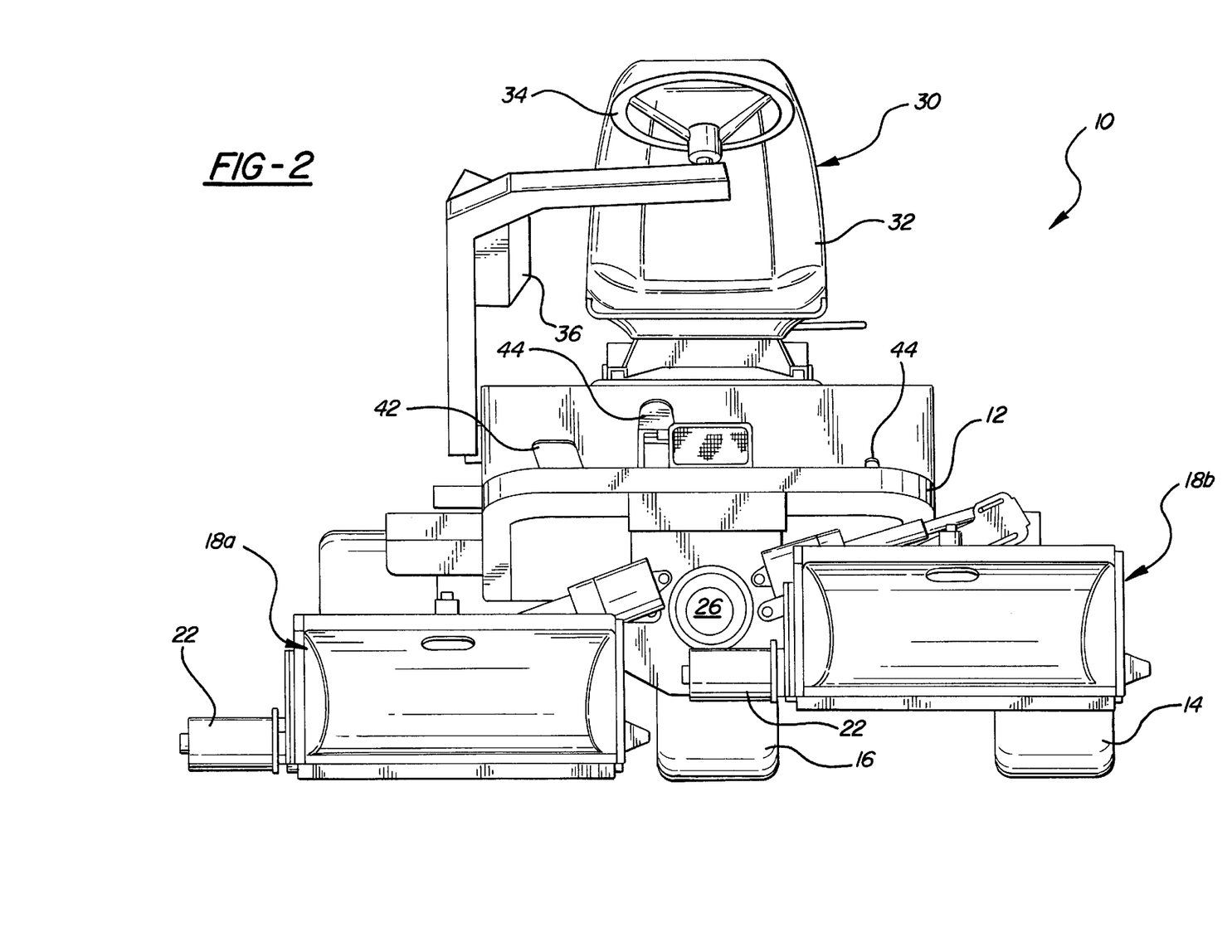
FIG. 2 is a front view of the drive riding greens mower of FIG. 1 illustrating various components of the mower including the reel type cutting heads.
Figure 3:
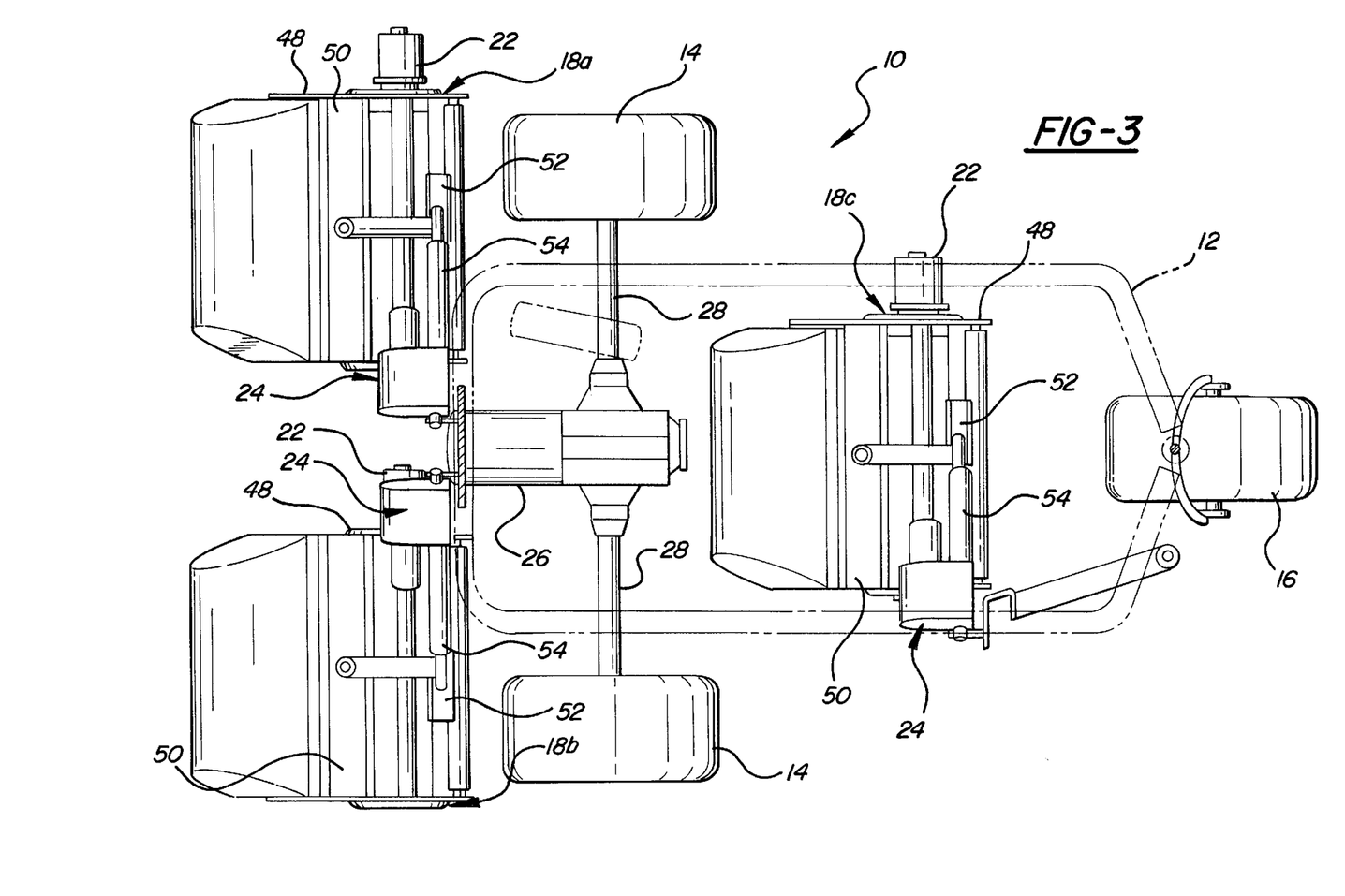
FIG. 3 is a top view of the riding greens mower illustrating features of the mower generally disposed below the frame member.

FIGS. 1–3 illustrate the general arrangement of an electric riding mower 10. The mower 10 includes a frame 12 supported for movement on a pair of drive wheels 14 and on a rear steerable wheel 16. Two reel type cutting head assemblies 18a and 18b, are disposed at the forward corners of frame 12 and a third reel type cutting head assembly 18c is centrally disposed below frame 12. A battery power source 20 is made up of a plurality of individual battery packs. Each cutting head assembly 18a–18c is driven by its own electrical reel motor 22 and each cutting head assembly 18a–18c is capable of being individually raised or lowered by its own lift assembly 24. Battery power source 20 also provides electrical energy to a primary mover, electric motor 26, which is adapted to provide driving torque through drive axle 28 to each drive wheel 14 for propelling mower 10.

Supported also on frame 12 is an operator control station 30 which primarily includes a seat assembly 32, a steering wheel 34, and a control panel 36. Steering drive components 35 are connected to steering wheel 34 and allow the operator to control steerable wheel 16. A foot deck 38 is also provided and includes brake pedal 40, directional control pedal 42, and reel motor activation switch (mow switch) 44, each of which are ergonomically positioned for operator comfort and ease of operation. It will be appreciated that the previously mentioned components are discussed in greater detail in the Applicant's previously referenced U.S. patents.

Lift assemblies 24 connect to cutting heads 48 of cutting head assemblies 18a, 18b, and 18c. Each cutting head 48 is mounted to a pull frame 50. Pull frame 50 attaches to a lift arm 52. The height of lift arm 52 is determined by the position of a cylinder 54 which is shown herein as an electrically controlled cylinder, but may be a hydraulic, electric, or a combination electro-hydraulic cylinder. The cylinders are controlled by the lift assemblies 24.

Figure 4:
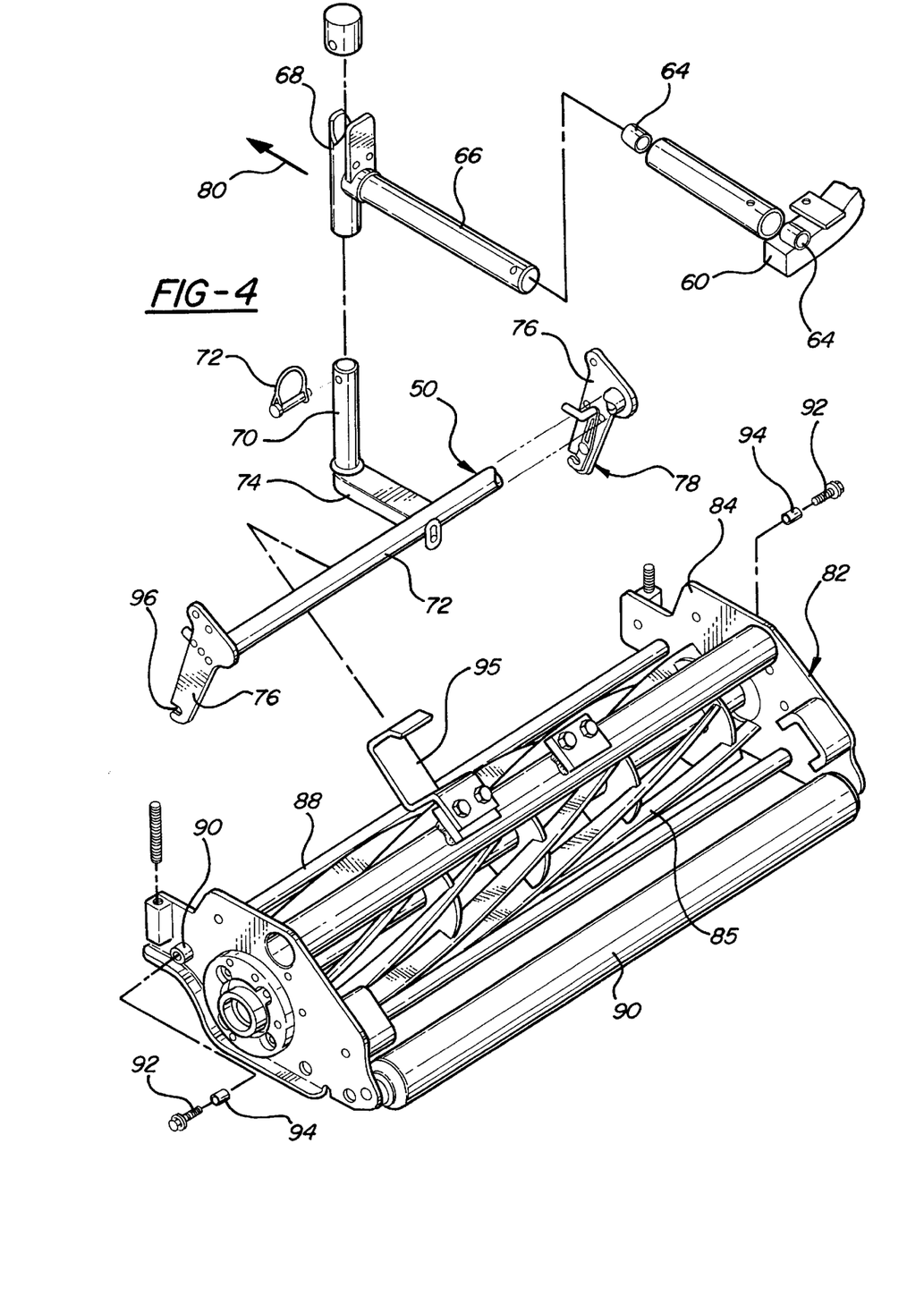
FIG. 4 is an exploded view of a cutting head and attached pull frame having the release mechanism arranged in accordance with the principles of the present invention.

FIG. 4 depicts an exploded view of the attachment between cutting head 48, pull frame 50, and a portion of lift arm 52. Lift arm 52 includes transverse section 60 and longitudinal section 62 welded to transverse section 60. Longitudinal section 62 is a tubular section having a pair of bushings 64 press-fitted into the interior of longitudinal section 62. A pivot shaft 66 is inserted within the interior of bushings 64 and longitudinal section 62. A vertical cylinder 68 is attached at the end of pivot shaft 66. The vertical cylinder 68 receives a spindle 70 which is inserted into vertical cylinder 68 and locked in place by a linchpin 72. Thus, the pull frame 50 rotates about a vertical axis defined by spindle 70 and a horizontal axis defined by pivot shaft 66.

The pull frame 50 includes spindle 70 which is attached to a horizontal crossbar 72 via a extension member 74. A pair of vertical plates 76 are welded to the ends of horizontal crossbar 72. Shown on the inside of one vertical plate 76 is a latch mechanism 78. Spindle 70, horizontal crossbar 72, extension member 74, vertical plates 76, and latch mechanism 78 define the pull frame 50. The pull frame 50 is attached to cutting head 48 so that the pull frame 50 pulls the cutting head 48 in a forward direction demonstrated by the arrow 80.

Cutting head 48 includes a plurality of components to effect the grass cutting operation. The general structure of cutting head 48 will be known to those skilled in the art and will not be described in detail. Briefly, reel type cutting head 48 of FIG. 5 includes a frame 82 which comprises a pair of side plates 84 connected by crossbar 86, such as through a welding process. A reel type blade 85 is positioned within the frame 82 between a pair of spring-loaded housings 89 which enable rotational movement of blade 85 and limited transverse movement of the blade 85 as well. Cutting head 48 contacts the ground via a roller 90 mounted between side plates 84 of frame 82. A second crossrod 88 is also welded between side plates 84 of frame 82. Crossrod 88 has threaded ends 90. A bolt 92 is threaded into each threaded end 90 and secures a bushing 94 onto each end of crossrod 88. To assemble pull frame 50 and cutting head 48, each bushing 94 at the ends of crossrod 88 are inserted into horizontal slots 96 formed in each vertical plate 76 of pull frame 50. Once bushings 94 are inserted and secured in slots 96, the weight of cutting head 48 causes rotational movement in a counter clockwise direction about an axis defined by crossrod 88. In order to limit rotation, a hook 95 attaches to horizontal crossrod 86 and engages the crossbar 72 of the pull frame 50 to limit this rotational movement.

Figure 5:
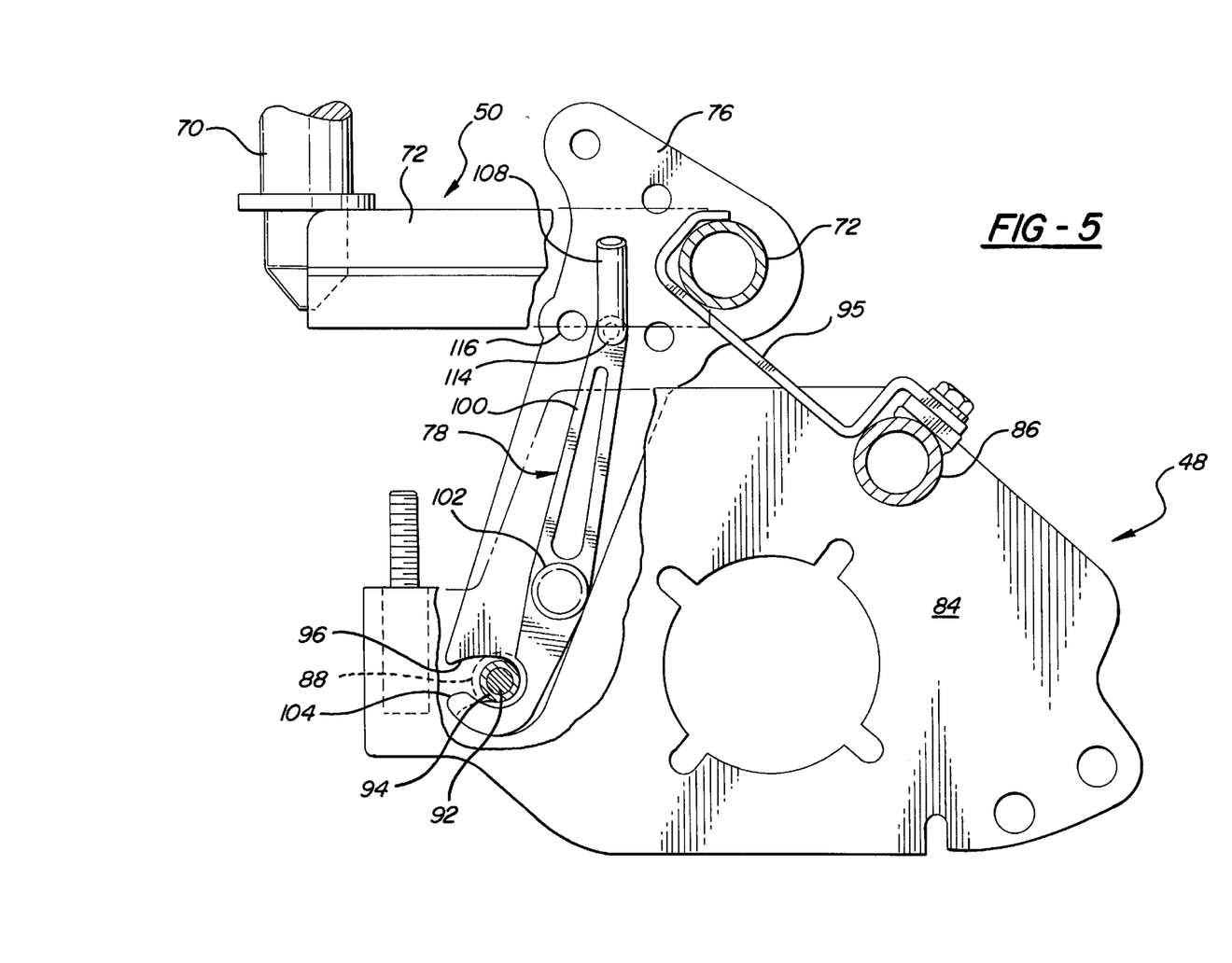
FIG. 5 is a partial, cut-away, side view of the release mechanism, the cutting head, and the pull frame with the release mechanism in a locked position.

FIG. 5 depicts a partial, cut-away, side view of the interconnection between pull frame 50 and reel type cutting head 48. Note that throughout the specification, like reference numerals will be used to refer to similar parts throughout the drawing. FIG. 5 shows a side view of cutting head 48 and pull frame 50. As discussed with respect to FIG. 4, vertical plate 76 includes horizontal slot 96 which forms a clearance fit with a bushing 94 bolted on the end of crossrod 88. Vertical plate 76 also includes latch mechanism 78. Latch mechanism 78 includes a locking plate 100 which is attached to vertical plate 76 by a pin 102. Locking plate 100 rotates about pin 102 and has a hooked section 104. Hooked section 104 engages the circumferential surface of crossrod 88 to form a clearance fit. The engagement locks bushing 94 in slot 96 when the locking plate is pivoted to the locked position, as shown in FIG. 5. Slot 96 bears a substantial portion of the weight of the cutting head 48 through bushing 94.

Figure 6:
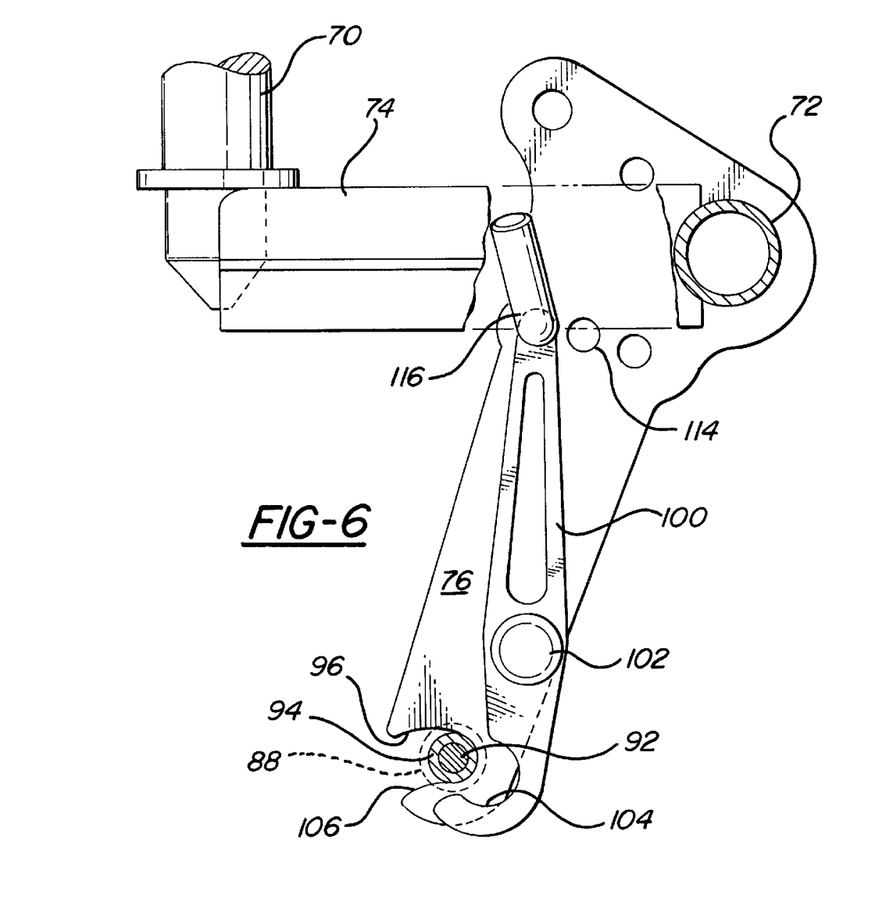
FIG. 6 is a side view of the release mechanism and pull frame with the release mechanism in the unlocked position.

FIG. 6 depicts a partial side view of latch mechanism 78 with locking plate 100 moved to an unlocked position. In this position, the hooked section 104 clears crossrod 88 so that bushing 94 may exit horizontal slot 96. FIG. 6 also illustrates an advantageous feature of this invention. The horizontal slot 96 includes a flat section 106 for bearing a substantial portion of the load of bushing 94. When the cutting head is lowered and mower 10 is moving forward cutting head 48 moves toward to the closed end of slot 96 along flat section 106. Movement during operation assists in maintaining bushing 94 in slot 96.

Figure 7:
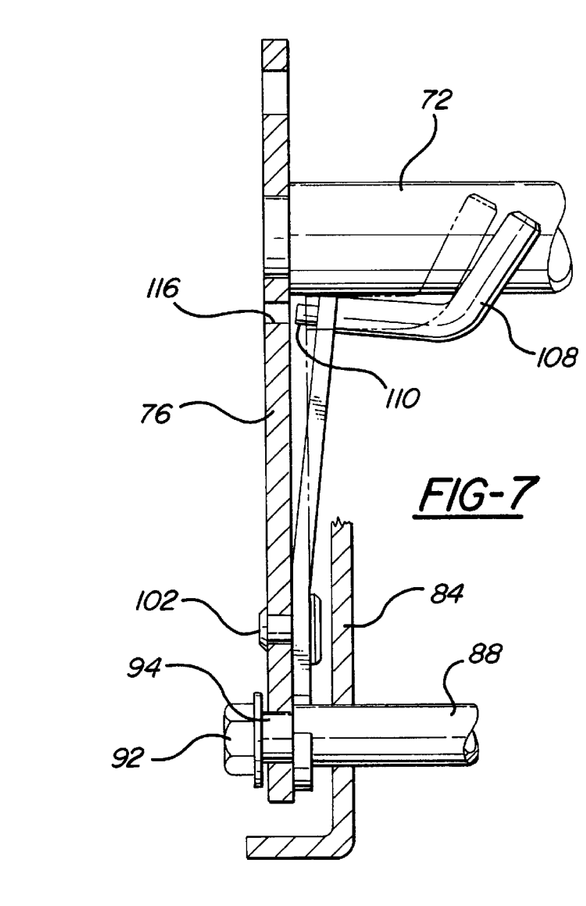
FIG. 7 is a partial, cross-sectional view of the pull frame and the release mechanism, with the release mechanism in transition between the locked and the unlocked position.

As shown in FIG. 7, locking plate 100 has a handle 108 attached to locking plate 100. Handle 108 includes a pin 110 which is inserted into one of apertures 114 or 116 to enable or prevent movement of locking plate 100. When pin 110 is inserted into aperture 114 as shown in FIG. 5, latch mechanism 78 is in the locked position. Similarly, when pin 110 is inserted into aperture 116, as shown in FIG. 6, latch mechanism 78 is the unlocked position. In order to move latch mechanism 78 from the locked to the unlocked position, the user moves handle 108 inboard to remove pin 110 from either of apertures 114 or 116. The operator then rotates locking plate 100 about pin 102 in order to move locking plate 100 to the desired position.

Of particular advantage of the present invention, one will observe that the entirety of the latch mechanism 78 conveniently fits between the side plates 84 of the cutting head 48 and vertical plates 76 of pull frame 50. Further, the present invention enables the operator to quickly lock and unlock cutting head 48 from the pull frame 50 through inboard movement of handles 108 and rotation of locking plate 100.

In operation, if cutting head 48 is attached to pull frame 50 on mower 10, pin 110 is inserted into aperture 114 to lock pull frame to cutting head 48. In order to remove cutting head 48 from pull frame 50, and mower 10, the user pulls handles 108 of latch mechanism 78 inboard and moves pins 110 into apertures 116. This releases crossrod 88 from hooked section 104 so that bushing 94 may slide out from slot 96. The operator then starts mower 10 and backs-up mower 10 to remove bushings 94 from horizontal slots 96. The operator then raises lift arm 52 in order to move pull frame 50 away from cutting head 48. The operator then can easily remove cutting head 48 away from the mower.

While specific embodiments have been shown and described in detail to illustrate the principles of the latch mechanism for a cutting head, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the invention as described in the following claims.

What is claimed:

1. A self-propelled riding mower comprising:
   a vehicle frame supported upon a plurality of ground engaging wheels;
   at least one reel type cutting head supported from the frame, the cutting head being moveable between a raised non-operative position and a lowered operative position in which the cutting head engages the ground;
   a cutting head support assembly associated with the at least one cutting head and attached to the vehicle frame, the cutting head support assembly having a pull frame for attaching the cutting head assembly to the cutting head;
   a latch disposed between the pull frame and the cutting head, the latch enabling attachment and detachment of the cutting head to the pull frame; and
   a prime mover adapted to provide driving torque to at least one of the ground engaging wheels.

2. The self-propelled riding mower as claimed in claim 1 wherein when the latch is in an unlocked position, the cutting head may be attached to and detached from the pull frame, and when the latch is in a locked position, the cutting head is fixedly attached to the pull frame.

3. The self-propelled riding mower as claimed in claim 2 wherein the latch further comprises a latch plate rotatable for effecting the locked and the unlocked positions.

4. The self-propelled riding mower as claimed in claim 3 wherein the latch plate includes a pin which is secured to the pull frame in one of two positions to effect the locked and unlocked position.

5. The self-propelled riding mower as claimed in claim 3 wherein the latch plate includes a curved end for engaging a portion of the cutting head to lock the cutting head in place.

6. The self-propelled riding mower as claimed in claim 1 wherein:
   the cutting head further comprises a cutting head frame including a pair of side plates;
   the pull frame further comprises a pair of vertical plates; and
   the latch further comprises a pair of latch plates;
   wherein each of the pair of side plates is disposed inside of and in proximity to a respective vertical plate, and the latch plate is disposed between a respective vertical and side plate pair.

7. The self-propelled riding mower as claimed in claim 1 wherein the self-propelled riding mower is electrically operated and further comprises:
   a battery power source;
   at least one electric motor for driving the at least one cutting head, the at least one electric motor receiving electrical power from the battery power source.

8. The self-propelled riding mower as claimed in claim 1 wherein the self-propelled riding mower is a hydraulically operated mower.

9. A pull frame assembly for securing a reel type cutting head to a self-propelled riding mower, the reel type cutting head having a frame including a pair of side plates, comprising:
   a horizontal crossrod;
   a pair of horizontally spaced, vertical plates, attached to the crossrod, where the vertical plates include a cut-out section for receiving a connection member attached to the reel type mower head; and
   a pair locking plates attached and adjacent to a respective vertical plate, the locking plates enabling installation and removal of the reel type cutting head in a first position and securing the reel type cutting head in a second position.

10. The pull frame assembly of claim 9 further comprising:
    a pair of apertures formed in each vertical plate; and
    a pin attached to each locking plate and inserted into one of the pair of apertures formed in each vertical plate such that when the pins are inserted into the apertures, the pins secure the locking plate in one of a locked and unlocked position.

11. The pull frame assembly of claim 10 wherein the locking plate is flexible to allow insertion and removal of the pins into and from the apertures.

12. The pull frame assembly of claim 9 further comprising a flat located on a lower side of each cut-out section to bear a substantial portion of the load of the cutting head.

13. The pull frame assembly of claim 9 wherein the cut-out section engages a shoulder bolt secured to the side plates of the cutting head.

14. The pull frame assembly of claim 9 wherein each locking plate is attached to a respective vertical plate such that the locking plate pivots about a substantially horizontal axis.

* * * * *

UNITED STATES PATENT AND TRADEMARK OFFICE
CERTIFICATE OF CORRECTION

PATENT NO. : 5,865,016
DATED : February 2, 1999
INVENTOR(S) : Charles R. Toman

Page 1 of 1

It is certified that error appears in the above-identified patent and that said Letters Patent is hereby corrected as shown below:

Column 6, claim 6,
Line 33, delete "pair of"
Line 34, "a respective" should be -- one of the --
Line 34, "plate," should be -- plates, --
Line 35, before "the" insert -- each of the --
Line 35, "plate" should be -- plates --
Lines 35-36, "a respective vertical and" should be -- one of the --
Line 36, "plate" should be -- plates --
Line 36, "pair" should be -- and one of the latch plates --

Column 6, claim 7,
Line 41, delete "at least one"

Signed and Sealed this

Fifth Day of March, 2002

*Attest:*

*Attesting Officer*

JAMES E. ROGAN
*Director of the United States Patent and Trademark Office*